United States Patent
Wheat et al.

(10) Patent No.: US 6,339,879 B1
(45) Date of Patent: Jan. 22, 2002

(54) METHOD OF SIZING AND FORMING A COOLING HOLE IN A GAS TURBINE ENGINE COMPONENT

(75) Inventors: Gary Eugene Wheat, Madisonville; Terri Kay Brown, Central City; Thomas Phillip Schumacher, Madisonville, all of KY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/684,987

(22) Filed: Aug. 29, 2000

(51) Int. Cl.[7] .............................................. B21D 53/78
(52) U.S. Cl. .......................... 29/889.721; 29/889.722; 29/889.7
(58) Field of Search ........................ 29/889.7, 889.721, 29/889.722, 527.2, 527.4; 415/115, 116; 416/95, 97 R, 241 R; 427/142, 282, 277

(56) References Cited

U.S. PATENT DOCUMENTS

| | | | |
|---|---|---|---|
| 3,688,075 A | * | 8/1972 | Cupler, II .................... 219/121 |
| 3,696,504 A | * | 10/1972 | Culper, II .................... 29/558 |
| 4,159,407 A | * | 6/1979 | Wilkinson et al. ........ 219/69 M |
| 5,062,768 A | * | 11/1991 | Marriage .................. 416/97 R |
| 5,223,692 A | * | 6/1993 | Lozier et al. ........... 219/121.67 |
| 5,621,968 A | * | 4/1997 | Kikkawa et al. ........ 29/889.721 |
| 5,767,482 A | * | 6/1998 | Turner .................... 219/121.71 |
| 5,771,577 A | * | 6/1998 | Gupta et al. ............ 29/889.721 |
| 5,864,949 A | * | 2/1999 | Kildea ........................... 416/95 |
| 6,162,347 A | * | 12/2000 | Fleck ..................... 29/889.721 |
| 6,265,022 B1 | * | 7/2001 | Fernihough et al. ......... 427/142 |

* cited by examiner

Primary Examiner—I Cuda-Rosenbaum
(74) Attorney, Agent, or Firm—Andrew C. Hess; V. Ramaswamy

(57) ABSTRACT

A method for accurately sizing and forming the cooling holes of an air-cooled gas turbine engine component on which a protective diffusion coating will be deposited. The method generally entails drilling a hole in a surface region of a substrate, and then measuring the thickness of any recast surface region surrounding the hole and created as a result of a portion of the surface region having melted and then resolidified. The thickness of the additive layer of the diffusion coating that will deposit on a corresponding recast surface region of the component is then predicted based on an inverse relationship determined to exist with the thickness of the recast surface region formed during drilling of the cooling hole. An appropriately-oversized hole can then be formed in the component so that, after depositing the diffusion coating on the component, the additive layer grows sufficiently within the hole to yield a cooling hole approximately having the required final diameter.

20 Claims, 2 Drawing Sheets

METHOD OF SIZING AND FORMING A COOLING HOLE IN A GAS TURBINE ENGINE COMPONENT

FIELD OF THE INVENTION

The present invention relates to air-cooled components, such as airfoil components of gas turbine engines. More particularly, this invention is directed to a method for sizing and forming the cooling holes of such a component protected by a diffusion environmental coating, in which the build up of the coating within the cooling holes can be predicted and accommodated to ensure proper cooling air flow through the cooling holes.

BACKGROUND OF THE INVENTION

Airfoils of turbine blades and vanes of gas turbine engines often require a complex cooling scheme in which cooling air flows through the airfoil and is then discharged through carefully configured cooling holes. The performance of a turbine airfoil is directly related to the ability to provide uniform cooling of its external surfaces. Consequently, the control of cooling hole size and shape is critical in many turbine airfoil designs because the size and shape of the opening determine the amount of flow exiting a given hole, its distribution across the surface of the component, and the overall flow distribution within the cooling circuit that contains the hole. Other factors, such as backflow margin (the pressure delta between cooling air exiting the cooling holes and combustion gas impinging on the airfoil) are also affected by variations in hole size. As a result, diametrical tolerances for airfoil cooling holes are typically on the order of about ±0.002 inch (about ±0.0508 mm) or less. To achieve these tolerances, precision drilling techniques such as laser beam machining, electrical discharge machining (EDM) and electrostream (ES) drilling are typically used to form the holes. Once formed, subsequent airfoil manufacturing operations must be carefully performed so that the dimensions of the holes are not significantly altered.

Due to the severity of the operating environment of turbine blades and vanes, environmentally protective coatings are typically applied to the airfoils of these components when manufactured, and often reapplied during their repair. Diffusion aluminides coatings and MCrAlY coatings overcoated with a diffusion aluminide coating are widely used in the gas turbine engine industry as environmental coatings for airfoils. Diffusion aluminide coatings are produced by aluminizing the airfoil surfaces by such known methods as pack cementation, vapor (gas) phase (above-pack) aluminiding (VPA), chemical vapor deposition and slurry coating techniques. Each of these processes generally entails reacting the surfaces of the airfoil with an aluminum-containing composition to form two distinct zones, an outermost of which is an additive layer that contains the environmentally-resistant intermetallic phase MAl, where M is iron, nickel or cobalt, depending on the substrate material (e.g., mainly β(NiAl) if the substrate is Ni-base). The chemistry of the additive layer can be altered with such as elements as chromium, silicon, platinum, palladium, rhodium, hafnium, yttrium and zirconium in order to modify the environmental properties of the coating. Beneath the additive layer is a diffusion zone comprising various intermetallic and metastable phases that form during the coating reaction as a result of diffusional gradients and changes in elemental solubility in the local region of the substrate.

As is apparent from the concerns discussed above regarding cooling hole dimensions, diffusion aluminide coatings must not interfere with the airflow requirements of an airfoil, and more specifically, the cooling air flow that exits each cooling hole at the airfoil surface. As a result, the cooling holes of an airfoil must be formed in an oversize condition in anticipation of the thickness of the additive layer of the aluminide coating, or care must be taken to avoid aluminizing of the cooling holes. Likewise, aluminizing of airfoils returned for repair must also be performed with care to avoid or minimize aluminizing of the cooling holes and internal surfaces of the airfoils.

The procedure for establishing the proper pre-aluminized diameter of a cooling hole for production airfoils has been to machine cooling holes of different diameters in otherwise production airfoils, perform multiple coating operations under different coating conditions on the airfoils, and then test the airfoils to verify their airflow properties and determine what diameters and coating conditions yield the cooling hole diameters that achieve the required airflow properties. The latter entails sectioning the cooling holes to measure the hole diameters and examine the adequacy of the aluminide coatings. While reliable and accurate, this process requires the use of production hardware and long cycle times, and relies on a hit-or-miss method that is often laborious and tedious.

In view of the above, it would be desirable if an improved process were available for sizing and forming the cooling holes of gas turbine engine components protected by a diffusion coating.

SUMMARY OF THE INVENTION

The present invention provides a method for accurately sizing and forming the cooling holes of an air-cooled gas turbine engine component, such as a turbine blade or vane. The invention is particular directed to air-cooled components in which one or more cooling holes having specified diameters must be formed to achieve preestablished cooling airflow conditions, and on which a diffusion coating must be deposited to protect the component from its harsh operating environment. While the material of a component and the parameters of a diffusion aluminizing process have been understood to influence the thickness of the additive layer of a diffusion aluminide coating, and therefore affect the final diameter of a cooling hole in the component, the present invention is based on the determination that different drilling techniques used to form cooling holes also affect the final diameter of a cooling hole.

The method generally entails forming a hole in a surface region of a substrate, and then measuring the thickness of any recast surface region surrounding the hole and created during forming of the hole as a result of a portion of the surface region having melted and then resolidified. According to the invention, an inverse relationship has been determined to exist between the thickness of the recast surface region formed during drilling of a cooling hole and the growth rate of the additive layer under given deposition parameters. As such, by determining the thickness of the recast surface region on the substrate and the growth rate of a diffusion coating deposited on the substrate under a certain set of deposition parameters, the thickness of the additive layer of the diffusion coating deposited on the component can be predicted. Knowing the final diameter required of the cooling hole, an appropriately-oversized hole can be formed in the component so that, after depositing the diffusion coating on the component, the additive layer grows sufficiently within the hole to yield a cooling hole approximately having the required final diameter.

The process of this invention is useful for newly manufactured airfoils and presumably for repaired airfoils, and avoids the deposition of an additive layer that is excessively thick or thin, which would result in insufficient or excessive (respectively) airflow through the cooling holes of the airfoil, thus adversely impacting the airflow and flow distribution through the airfoil. As a result, a notable advantage of the present invention is that it succeeds in maintaining required cooling hole dimensions for an air-cooled component protected by a diffusion aluminide coating, while significantly reducing the labor and time required to arrive at an optimal pre-aluminized cooling hole dimension.

Other objects and advantages of this invention will be better appreciated from the following detailed description.

DETAILED DESCRIPTION OF THE INVENTION

The present invention will be described in reference to a gas turbine engine turbine blade 10 represented in FIG. 1 and provided with cooling holes 18 and a diffusion aluminide coating 20, the latter of which are represented in cross-section in FIG. 2. While the advantages of this invention will be described with reference to the blade 10 and a diffusion aluminide coating 20, the teachings of this invention are generally applicable to any component protected by a diffusion coating, as well as surface holes of various configurations.

Figure 1:
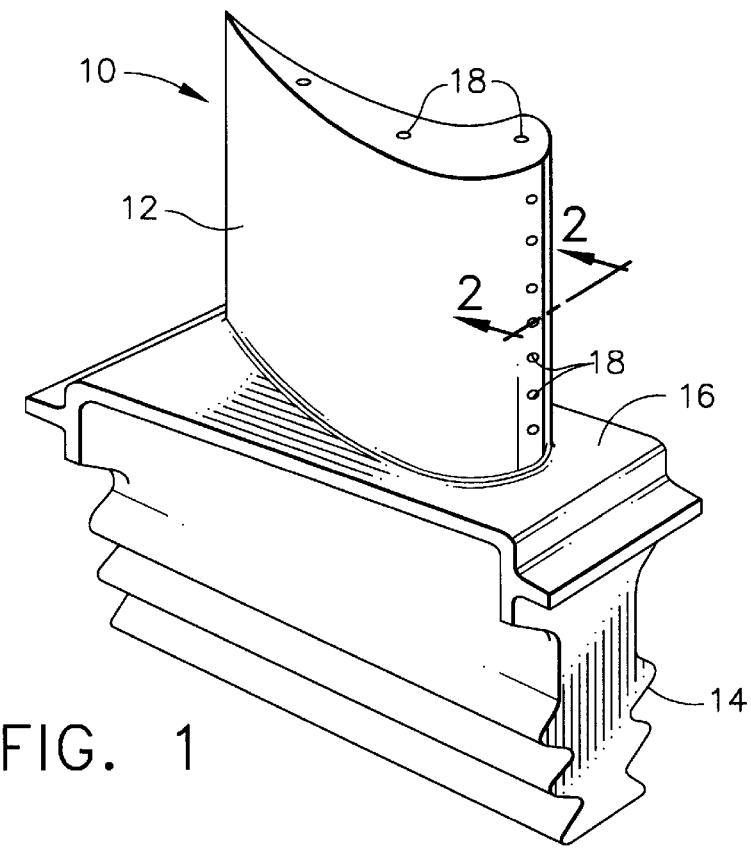
FIG. 1 shows a high pressure turbine blade with surface cooling holes.

The blade 10 shown in FIG. 1 is a high pressure turbine blade that may be formed of an iron, nickel or cobalt-base superalloy. The blade 10 includes an airfoil section 12 and platform 16 against which hot combustion gases are directed during operation of the gas turbine engine, and whose surfaces are therefore subjected to severe attack by oxidation, corrosion and erosion. The airfoil 12 is anchored to a turbine disk (not shown) with a dovetail 14 formed on a root section of the blade 10. Cooling holes 18 are present in the airfoil 12 through which bleed air is forced to transfer heat from the blade 10 and film cool the surrounding surfaces of the airfoil 12. The cooling holes 18 may be formed (drilled) by various known techniques, including laser beam machining, electrostream (ES) drilling and electrical discharge machining (EDM) such as spinning electrode EDM, though all methods of drilling that would produce recast are within the scope of this invention.

Figure 2:
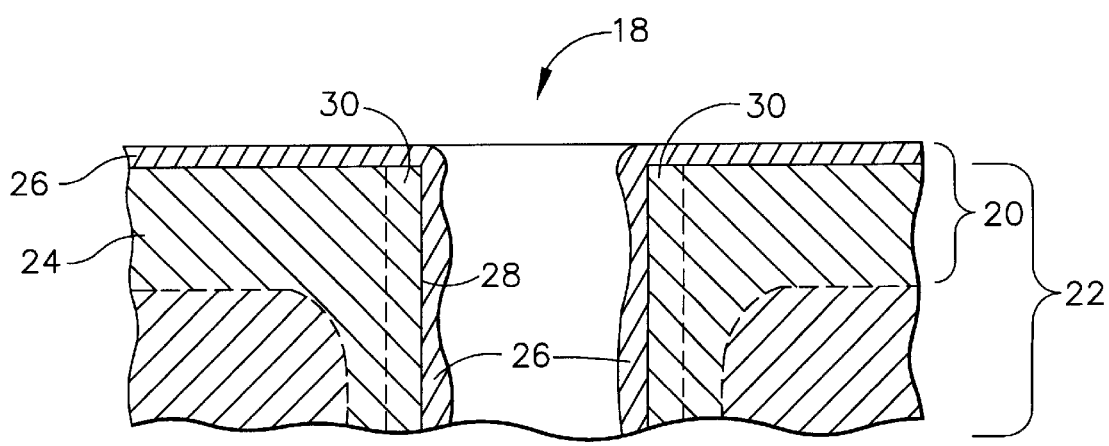
FIG. 2 is a partial sectional view through one of the cooling holes of the airfoil of FIG. 1, and shows a diffusion aluminide coating on the surfaces of the airfoil and the cooling hole.

According to this invention, the airfoil section 12 is protected from the hostile environment of the turbine section by the diffusion aluminide coating 20, shown in FIG. 2 as being formed in and overlying a substrate region 22 of the blade 10. The substrate region 22 may be the base superalloy of the blade 10, or an overlay coating such as MCrAlY deposited by known methods on the surface of the blade 10. As known in the art, the aluminide coating 20 may incorporate a variety of additional elements to modify the environmental and physical properties of the coating 20. Various techniques are known for depositing the aluminide coating 20, including pack cementation and vapor phase aluminizing (VPA), though other deposition methods are also within the scope of this invention.

As shown in FIG. 2, the aluminide coating 20 has two distinct zones, an outermost of which is an additive layer 26 that contains environmentally-resistant intermetallic phases such as MAl, where M is iron, nickel or cobalt, depending on the substrate material. The chemistry of the additive layer 26 may be modified by the addition of elements such as chromium, silicon, platinum, rhodium, hafnium, yttrium and zirconium. A typical thickness for the additive layer 26 is up to about 75 micrometers. During high temperature exposure in air, the additive layer 26 forms a protective aluminum oxide (alumina) scale (not shown) that inhibits oxidation of the diffusion coating 20 and the underlying substrate region 22. Beneath the additive layer 26 is a diffusion zone (DZ) 24 that typically extends about 25 to 50 micrometers into the substrate region 22. The diffusion zone 24 comprises various intermetallic and metastable phases that form during the coating reaction as a result of diffusional gradients and changes in elemental solubility in the local region of the substrate.

As shown in FIG. 2, the additive layer 26 not only overlies the surface of the blade 10, but is also deposited on the walls of the cooling hole 18. As such, the diameter of the cooling hole 18 after coating is less than that of the originally drilled hole 28. In the past, to produce a cooling hole 18 having a diameter of about 0.012 inch (about 0.305 mm), it might be necessary to drill the hole 28 to a diameter of about 0.014 to about 0.015 inch (about 0.356 to about 0.381 mm) due to variances in the thickness of the additive layer 26 deposited on the surface of the hole 28 by different deposition methods and conditions, including deposition parameters such as temperature and time, as well as other factors not well understood or predictable in the past. Because the diameter of the cooling hole 18 must be carefully controlled in order to achieve the required cooling airflow through the cooling hole 18 and through the cooling circuit of the blade 10, it is evident that the thickness of the additive layer 26 and the diameter of the drilled hole 28 must be controlled in combination to achieve the final diameter required for the cooling hole 18.

According to the present invention, an inverse relationship has been determined to exist between the growth rate of the additive layer 26 that occurs during aluminizing under given deposition conditions, and the amount of surface recast that occurs during machining of the drilled hole 28. As used herein, "recast" signifies the process of surface melting and subsequent resolidification that occurs during machining of the hole 28, developing a recast region 30 in the surface of the hole 28 as represented in FIG. 2. Blades formed of various superalloys have been evaluated and found to exhibit this same inverse relationship with moderate deviations. With knowledge of the inverse relationship, the present invention enables the growth of the additive layer 26 to be accurately predicted in advance of drilling the hole 28, thus enabling the final diameter of the cooling hole 18 to be achieved with little or no repeated drilling, coating and inspection steps.

In one example, holes 28 had previously been drilled by conventional EDM in production high pressure turbine (HPT) blades formed of single-crystal René N5 superalloy having a nominal composition, in weight percent, of 7.5% Co, 7.0% Cr, 6.5% Ta, 6.2% Al, 5.0% W, 3.0% Re, 1.5% Mo, 0.15% Hf, 0.05% C, 0.004% B, 0.01% Y, the balance nickel. The holes 28 were drilled to a diameter of about 0.014 inch (about 0.356 mm), and cooling holes 18 having a required diameter of about 0.012 inch (about 0.305 mm) were obtained following deposition of a diffusion aluminide coating 20 by VPA. The particular VPA process was performed at a temperature of about 1079° C. for a duration of about seven hours using aluminum trifluoride (NH$_4$F) as the activator and chromium/aluminum as the aluminum source (donor). However, a production change resulted in the holes 28 being drilled by spinning electrode EDM. The process capability for HPT blades drilled by conventional EDM was historically 0.93 Cpk. However, identical blades drilled by spinning electrode EDM and then aluminized by the very same VPA process exhibited significantly lower airflow, with a Cpk for the first run at −0.30.

The anomaly in the thicknesses of the additive layers 26 was eventually associated with the different thicknesses of the recast regions 30 in the surfaces of their substrate regions 22 in and surrounding the holes 28. Analysis of blades drilled by the two methods showed significant differences in the thickness of the recast region 30, about 0.002 inch (about 50 micrometers) for spinning electrode EDM compared to about 0.0004 inch (about 10 micrometers) for conventional EDM. The initial presumption was that, under a given set of deposition conditions, the thickness of an additive layer 26 would increase with increasing thickness of a recast region 30. However, the inverse relationship noted above was surprisingly determined to exist. While not wishing to be held to any particular theory, it is believed that the relationship involves the different transport and diffusion characteristics of ions through the solid matrix of the recast and substrate regions 30 and 22, into which the diffusing element (s) of the aluminide coating 20 diffuse in forming the diffusion zone 24 of the coating 20. Under analysis by X-ray diffraction (XRD), the crystal lattice of the recast region 30 was found to be distorted as compared to the parent substrate region 22. This distortion is believed to allow diffusion to proceed into the recast region 30 for an extended period due to massive defects in the lattice as compared to the parent substrate region 22. The varying degrees of entropy in the recast region 30 would act as defects that promote the diffusion and energy uptake, and therefore reduce the time and energy available to build the additive layer 26 of the aluminide coating 20. Based on this theory, a thicker recast region 30 would allow for less time and energy for growing the additive layer 26. In contrast, the parent substrate region 22 (adjacent the recast region 30) would achieve equilibrium much faster than the distorted matrix of the recast region 30, and therefore more energy is available for growing the additive layer 26.

Figure 3:
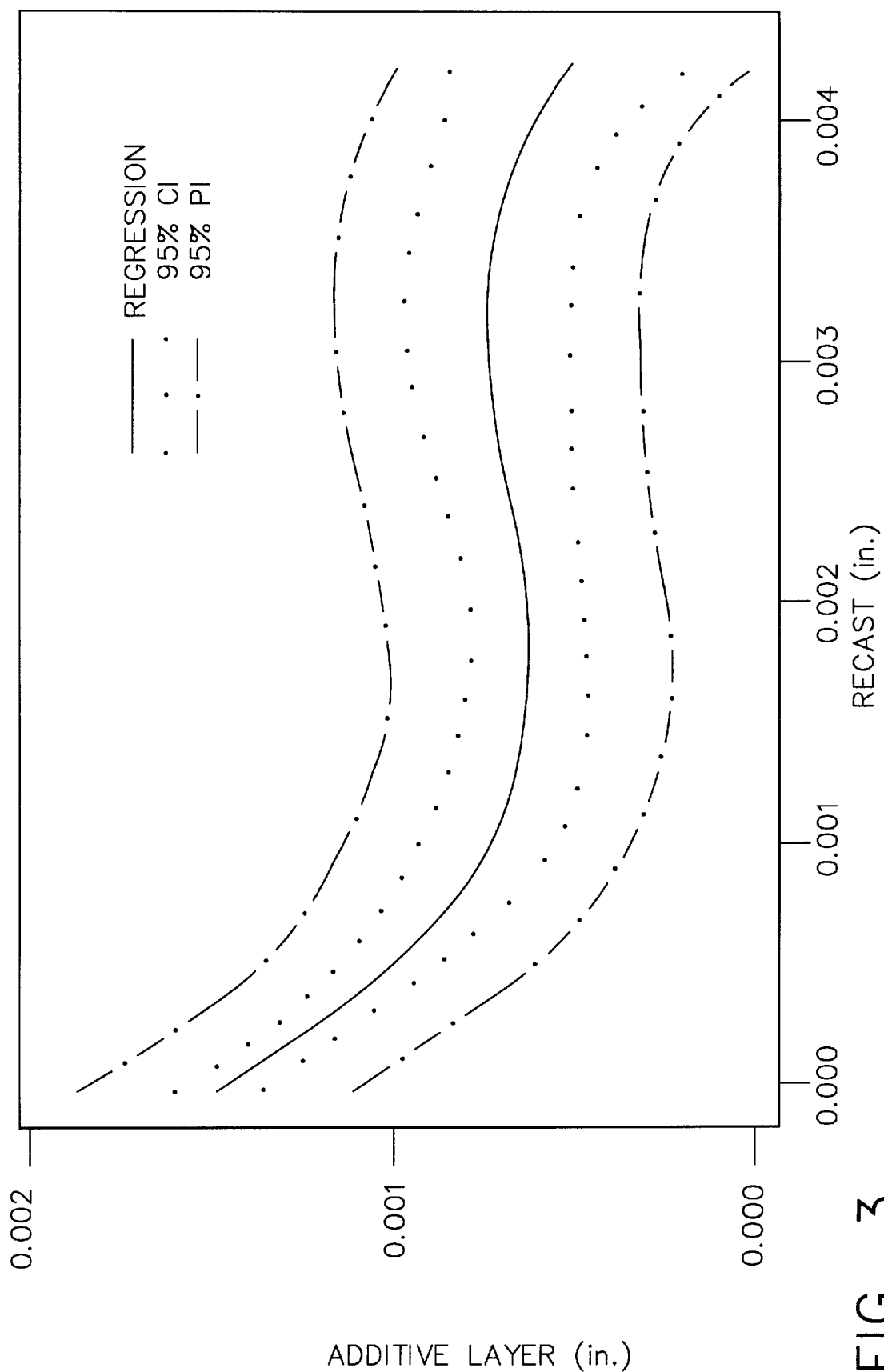
FIG. 3 represents data correlating the thickness of an additive layer of the aluminide coating to the thickness of a recast region in the surface of the cooling hole of FIG. 2.

FIG. 3 represents data obtained by XRD, and correlates the thickness of the additive layer to the thickness of the recast region for diffusion aluminide coatings deposited on René N5 turbine blades with cooling holes drilled by various drilling techniques, including electrostream drilling (no measurable recast), EDM and laser beam. Each of the coatings was deposited by VPA under essentially the same conditions identified above for the production N5 blades. In accordance with this invention, the relationship seen in FIG. 3 is inverse, with greater additive layer thicknesses associated with thinner recast regions. The data show that a cubic relationship exists, the polynomial regression of which is:

$$Y=0.0015-1.24403X+555.860X^2-75367.1X^3$$

where X and Y are the thicknesses of the recast region and additive layer, respectively, in inches. This second order relationship corresponds to the diffusion process being dominated by nickel and aluminum concentrations, based on nickel diffusing outward into the additive layer 26 and aluminum diffusing inward into the diffusion zone 24.

In view of the above, if the same technique is used to d e posit an aluminide coating 20 on another René N5 superalloy blade, the thickness of the additive layer 26 that will deposit on the surfaces of the initially drill ed holes 28 can be predicted based on the thickness of the recast region 30 formed when the holes 28 are drilled. Applying this knowledge to the single-crystal René N5 HPT blades discussed above, additional blades were drilled by spinning electrode EDM and then aluminized using the same VPA technique. However, the machining parameters were modified to achieve faster drilling and dwell, which in turn increased the thickness of the recast region within each hole to about 0.0012 inch (about 30 micrometers) so as to reduce the thickness of the additive layer to about 0.00067 inch (about 17 micrometers), predicted from FIG. 3. In a first processing run, the actual thickness of the additive layers was about 0.00072 inch (about 18 micrometers). A subsequent production run yielded similar results, with the result that Cpk was increased from −0.30 (for the blades machined by the original spinning electrode EDM parameters) to 1.97 (for the blades machined by the modified spinning electrode EDM parameters).

Consistent with this invention, when evaluating cooling holes 18 formed by electrostream drilling to produce recast regions 30 of minimal thickness, the coating mechanisms of different diffusion coating processes have been observed to be determined largely by the parent alloy (the substrate region 22) where crystal defects are not predominant. As a result, under the present theory, more time and energy is available to build up the additive layer 26 on holes 28 formed by electrostream drilling under a given set of coating conditions, as compared to holes 28 formed by other methods to have thicker recast regions 30 and then coated under the same set of coating conditions. During the investigation of this invention, recast thicknesses observed for conventional EDM and spinning electrode EDM were about 0.003 to about 0.008 inch (about 75 to 200 micrometers) and about 0.0005 inch to about 0.003 inch (about 10 to 75 micrometers), respectively, though it is foreseeable that lesser or greater recast thicknesses could be produced by these drilling methods. Laser beam machining creates a recast region 30 of significant thickness due to the higher temperatures of the process, but the resulting recast region 30 is prone to delamination by which the underlying parent substrate region 22 is exposed during coating. As a result, growth of the additive layer 26 is greater where delamination has occurred in a hole 28 drilled by laser beam machining.

In subsequent investigations, the additive layers of diffusion aluminide coatings deposited by pack cementation and VPA have exhibited the same inverse relationship. Different equations have been obtained for different superalloys, including superalloys commercially known under the names René 80, 108, 125 and 142. For a given substrate material, the inverse relationship generally remains the same when different deposition methods and parameters are used, with only the growth rate of the additive layer changing.

In view of the above, the cooling holes 18 in the blade 10 shown in FIG. 1 (or a vane or any other air-cooled gas turbine engine component) can be properly sized to achieve a desired airflow by first forming a hole in the surface of another blade or other suitable substrate, preferably of the same material from which the blade 10 is formed. The method used to form the holes can be any suitable technique that will produce the same amount of recast as the method that will be used to form the holes 28 in the blade 10. For this reason, the same method and parameters that will be used to form the holes 28 in the blade 10 are most preferred. The thickness of any recast region 30 in the hole is then measured, and the thickness of the additive layer 26 that will develop within each hole 28 of the blade 10 is predicted based on their particular inverse relationship for the blade material and the parameters of the aluminizing process. The holes 28 are then formed in the blade 10 to produce recast regions 30 of the same thickness measured for the substrate, but with each hole 28 having a diameter that is sufficiently larger than the desired diameter of its corresponding cooling hole 18 so that, when the diffusion aluminide coating 20 is deposited on the blade 10 under the specified coating conditions, the additive layer 26 deposited in each hole 28 will result in the desired diameter for the cooling holes 18. Alternatively, the diameters of the holes 28 could be kept constant, and the diffusion coating 20 deposited using coating conditions adjusted so that the additive layer 26 predictably grows at a faster or slower rate within the hole 28, again with the result that the cooling hole 18 has the desired diameter.

While the invention has been described in terms of a preferred embodiment, it is apparent that other forms could be adopted by one skilled in the art. For example, the method of this invention could also be applied to other components, including gas turbine engine shrouds and combustor centerbodies having surface cooling holes. Therefore, the scope of the invention is to be limited only by the following claims.

What is claimed is:

1. A method of sizing and forming a cooling hole in a gas turbine engine component, the method comprising the steps of:

forming a hole in a surface region of a substrate;

measuring the thickness of any recast surface region surrounding the hole and created during the forming step as a result of the forming step having caused a portion of the surface region to melt and then resolidify;

obtaining a gas turbine engine component having a surface region in which a cooling hole having a desired diameter is to be formed and on which will be deposited a diffusion coating comprising a diffusion zone that will extend into the surface region of the component and an additive layer that will deposit on the surface region of the component at a growth rate determined by a first set of deposition parameters;

predicting a thickness of the additive layer of the diffusion coating on the component based on an inverse relationship between the thickness of the recast surface region of the substrate and the growth rate of the additive layer;

forming a hole in the surface region of the component, the hole having a formed diameter that is larger than the desired diameter of the cooling hole; and then depositing the diffusion coating on the surface region of the component so that the additive layer grows sufficiently at the hole to yield the cooling hole approximately having the desired diameter.

2. A method according to claim 1, wherein the step of forming the hole in the surface region of the substrate causes a portion of the surface region to melt, resolidify and create the recast surface region in the surface region surrounding the hole.

3. A method according to claim 1, wherein the substrate and the component are both formed of a superalloy.

4. A method according to claim 3, wherein the substrate and the component are formed of the same superalloy.

5. A method according to claim 1, wherein the diffusion coating is a diffusion aluminide coating and is deposited on the surface region of the component by vapor phase aluminizing or pack cementation.

6. A method according to claim 1, wherein the component is an airfoil component of a gas turbine engine.

7. A method according to claim 1, wherein the diffusion coating is deposited on the surface region of the component under the first set of deposition parameters so that the additive layer deposits on the surface region of the component at the growth rate.

8. A method according to claim 1, wherein the diffusion coating is deposited on the surface region of the component under a second set of deposition parameters so that the additive layer deposits on the surface region of the component at a second growth rate that is different than the growth rate under the first set of deposition parameters.

9. A method according to claim 1, wherein the hole in the substrate and the hole in the component are formed by a machining process chosen from the group consisting of electrical discharge machining, laser beam machining, or electrostream machining.

10. A method according to claim 9, wherein the hole in the substrate and the hole in the component are formed by the same machining process and process parameters.

11. A method of sizing and forming a cooling hole in an airfoil component of a gas turbine engine, the method comprising the steps of:

forming a hole in a surface region of a substrate formed of a superalloy;

measuring the thickness of any recast surface region surrounding the hole and created during the forming step as a result of the forming step having caused a portion of the surface region to melt and then resolidify;

obtaining an airfoil component formed of the superalloy, the airfoil component having a surface region in which a cooling hole having a desired diameter is to be formed and on which will be deposited a diffusion aluminide coating comprising a diffusion zone that will extend into the surface region of the component and an additive layer that will deposit on the surface region of the component at a growth rate determined by a first set of deposition parameters;

predicting a thickness of the additive layer of the diffusion aluminide coating on the component based on an inverse relationship between the thickness of the recast surface region of the substrate and the growth rate of the additive layer;

forming a hole in the surface region of the component so that any recast surface region surrounding the hole has approximately the same thickness as the recast surface region surrounding the hole in the substrate, the hole having a formed diameter that is larger than the desired diameter of the cooling hole; and then depositing the diffusion aluminide coating on the surface region of the component so that the additive layer grows sufficiently at the hole to yield the cooling hole approximately having the desired diameter.

12. A method according to claim 11, wherein the step of forming the hole in the surface region of the substrate causes a portion of the surface region to melt, resolidify and create the recast surface region in the surface region surrounding the hole.

13. A method according to claim 11, wherein the diffusion aluminide coating is deposited on the surface region of the component by vapor phase aluminizing or pack cementation.

14. A method according to claim 11, wherein the component is a turbine blade.

15. A method according to claim 11, wherein the diffusion aluminide coating is deposited on the surface region of the component under the first set of deposition parameters so that the additive layer deposits on the surface region of the component at the growth rate.

16. A method according to claim 11, wherein the diffusion aluminide coating is deposited on the surface region of the component under a second set of deposition parameters so that the additive layer deposits on the surface region of the component at a second growth rate that is different than the growth rate under the first set of deposition parameters.

17. A method according to claim 11, wherein the hole in the substrate and the hole in the component are formed by a machining process chosen from the group consisting of electrical discharge machining, current electrical discharge machining, laser beam machining, or electrostream machining, and wherein the hole in the substrate and the hole in the component are formed by the same machining process.

18. A method of sizing and forming a cooling hole in an airfoil component of a gas turbine engine, the method comprising the steps of:

forming a hole in a surface region of a first component formed of a superalloy by a machining process chosen from the group consisting of electrical discharge machining, current electrical discharge machining, laser beam machining, or electrostream machining, during which a portion of the surface region melts and resolidifies to create a recast surface region in the surface region surrounding the hole;

measuring the thickness of the recast surface region surrounding the hole;

obtaining an airfoil component formed of the superalloy, the airfoil component having a surface region in which a cooling hole having a desired diameter is to be formed and on which will be deposited a diffusion aluminide coating comprising a diffusion zone that will extend beneath into the surface region of the airfoil component and an additive layer that will deposit on the surface region of the airfoil component at a growth rate determined by a first set of aluminizing parameters;

predicting a thickness of the additive layer of the diffusion aluminide coating on the airfoil component based on an inverse relationship between the thickness of the recast surface region of the first component and the growth rate of the additive layer;

forming a hole in the surface region of the airfoil component by the same machining process used to form the hole in the first component so that a recast surface region develops in the surface region surrounding the hole, the recast surface region having approximately the same thickness as the recast surface region surrounding the hole in the first component, the hole having a formed diameter that is larger than the desired diameter of the cooling hole; and then aluminizing the surface region of the airfoil component by vapor phase aluminizing or pack cementation so that the additive layer grows sufficiently at the hole to yield the cooling hole approximately having the desired diameter.

19. A method according to claim 18, wherein the surface region of the airfoil component is aluminized under the first set of aluminizing parameters so that the additive layer deposits on the surface region of the airfoil component at the growth rate.

20. A method according to claim 18, wherein the surface region of the airfoil component is aluminized under a second set of aluminizing parameters so that the additive layer deposits on the surface region of the airfoil component at a second growth rate that is different than the growth rate under the first set of aluminizing parameters.

* * * * *